United States Patent
Tolliver et al.

(10) Patent No.: US 7,931,191 B2
(45) Date of Patent: Apr. 26, 2011

(54) POST FACTORY DYNAMIC APPLICATION SELECTION

(75) Inventors: Reva Tolliver, Austin, TX (US); Brent Gaskamp, Austin, TX (US); James A. Howell, Jr., Georgetown, TX (US)

(73) Assignee: Dell Products L.P., Round Rock, TX (US)

(*) Notice: Subject to any disclaimer, the term of this patent is extended or adjusted under 35 U.S.C. 154(b) by 1234 days.

(21) Appl. No.: 11/334,321

(22) Filed: Jan. 18, 2006

(65) Prior Publication Data

US 2007/0164105 A1 Jul. 19, 2007

(51) Int. Cl.
*G06F 17/00* (2006.01)

(52) U.S. Cl. ......................................................... 235/375

(58) Field of Classification Search .................. 235/375; 717/173
See application file for complete search history.

(56) References Cited

U.S. PATENT DOCUMENTS

| | | | |
|---|---|---|---|
| 4,992,940 A | 2/1991 | Dworkin ......................... 364/401 |
| 5,978,590 A | 11/1999 | Imai et al. ...................... 395/712 |
| 5,995,757 A | 11/1999 | Amberg et al. ................. 395/712 |
| 6,018,720 A | 1/2000 | Fujimoto ......................... 705/26 |
| 6,041,411 A | 3/2000 | Wyatt ............................. 713/200 |
| 6,049,671 A * | 4/2000 | Slivka et al. .................... 717/173 |
| 6,151,643 A | 11/2000 | Cheng et al. ...................... 710/36 |
| 6,230,319 B1 | 5/2001 | Britt, Jr. et al. .................. 717/11 |
| 6,247,130 B1 | 6/2001 | Fritsch ........................... 713/171 |
| 6,266,809 B1 | 7/2001 | Craig et al. ....................... 717/11 |
| 6,282,709 B1 | 8/2001 | Reha et al. ....................... 717/11 |
| 6,381,709 B1 * | 4/2002 | Casagrande et al. ............ 714/18 |
| 6,948,169 B1 | 9/2005 | Amro et al. .................... 717/178 |
| 7,016,648 B2 * | 3/2006 | Haller et al. ................... 455/41.2 |
| 7,237,238 B2 * | 6/2007 | Peppers et al. ................. 717/170 |
| 2004/0015405 A1 * | 1/2004 | Cloutier et al. ................... 705/26 |
| 2006/0143264 A1 * | 6/2006 | Payne et al. .................... 709/203 |
| 2006/0168574 A1 * | 7/2006 | Giannini et al. ............... 717/168 |
| 2006/0248162 A1 * | 11/2006 | Kawasaki ...................... 709/217 |

* cited by examiner

*Primary Examiner* — Jamara A Franklin

(74) *Attorney, Agent, or Firm* — Hamilton & Terrile, LLP; Stephen A. Terrile

(57) ABSTRACT

A system for post factory dynamic application selection which includes an after point of sale configuration manager client module stored on a customer information handling system, a software determination module, and a download module is disclosed. The after point of sale configuration management client module enables the customer information handling system to access a manufacturer server. Based upon customer information, the software determination module determines which software to provide to the customer information handling system. Based upon the determination, the download module downloads software to the customer information handling system.

18 Claims, 4 Drawing Sheets

POST FACTORY DYNAMIC APPLICATION SELECTION

BACKGROUND OF THE INVENTION

1. Field of the Invention

The present invention relates to the field of information handling system peripherals, and more particularly to post factory dynamic application selection.

2. Description of the Related Services

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

One aspect of information handling systems relates to the marketing and supply of information handling systems such as computer systems along with pre-loaded software applications or services. Known information handling system suppliers such as Dell, Inc. provide software via the same channel as their computer systems. The information handling system software market continues to grow in complexity. It is known for information handling system suppliers to bundle existing software (e.g., music, photography, security, etc.) solutions with the information handling systems. One example of a service that is loaded onto the information handling system is an internet service provider (ISP) server. An issue relating to an internet service provider service is how the information handling system will access the internet, either at the customer's home or while the information handling system is away from the customer's home, as is often the case with portable information handling systems.

The access market continues to become more complex with multiple access modes available, a method for providing customers with the correct software based on the system configuration information such as network connection speeds is needed. This information about the type of access connection is often not available in the factory when the information handling system is fabricated. Known manufacturing methods address this issue by installing all possible software solutions during the fabrication process and providing messages to customers regarding how to select the best software for a particular type of access connection. As software applications become more complex and the supplier provides more options, providing multiple messages to the customer can provide a poor customer experience.

What is needed is a method for enabling dynamic selection of an appropriate application based upon the access mode selected by the customer.

SUMMARY OF THE INVENTION

In accordance with the present invention, the supplier installs a thin client called the APOS Configuration Manager Client (ACMC) on the information handling system in the factory that is able to collect system information and determine the appropriate software to download on the system after point of sale.

The method includes an after point of sale configuration manager client (ACMC) module that is installed in the factory to collect system information needed to determine appropriate software such as, but not restricted to line of business (Lob), Model, Service Tag, network speed, operating system (OS), etc. The ACMC functions as a thin client and includes the information needed to allow customers without an ISP to contact the supplier site to register with an ISP so that the customer can then get the rest of their software. The ACMC interacts with a supplier managed web site with a database which validates that the information handling system is a supplier system and determine which software is available for the customer to download based on the system information and supplier business information such as shipping date. This information can be pulled from a supplier data warehouse, from an order management system or other supplier systems based on a unique system identifier such as a service tag sent up from the ACMC module.

For example, if a customer has a broadband access mode available, when the ACMC accesses the supplier web site, the supplier may provide the customer with broadband software plug ins and services; voice over internet protocol (VoIP) software such as the Triple Play VoIP software; as well as content and services for high speed users (e.g., music, video, etc.). The system provides the supplier with an ability to up-sell a customer to higher speed connections to users whose current ISP providers are slower (e.g., a customer might connects at 1 MB from a location in which a 5 MB connection is available.)

The method also provides a fulfillment method for various business segments to provide promotional software and plug-ins.

In one embodiment, the invention relates to a system for post factory dynamic application selection which includes an after point of sale configuration manager client module stored on a customer information handling system, a software determination module, and a download module. The after point of sale configuration management client module enables the customer information handling system to access a manufacturer server. Based upon customer information, the software determination module determines which software to provide to the customer information handling system. Based upon the determination, the download module downloads software to the customer information handling system.

In another embodiment, the invention relates to a method for post factory dynamic application selection which includes enabling the customer information handling system to access a manufacturer server via an after point of sale configuration manager client module stored on a customer information handling system, determining which software to provide to the customer information handling system based upon customer information, and, downloading software to the customer information handling system based upon the determining.

In another embodiment, the invention relates to an apparatus for post factory dynamic application selection which includes means for enabling the customer information handling system to access a manufacturer server where an after point of sale configuration manager client module is stored on a customer information handling system, means for determining which software to provide to the customer information handling system based upon customer information, and based upon the determination, means for downloading software to the customer information handling system.

BRIEF DESCRIPTION OF THE DRAWINGS

The present invention may be better understood, and its numerous objects, features and advantages made apparent to those skilled in the art by referencing the accompanying drawings. The use of the same reference number throughout the several figures designates a like or similar element.

DETAILED DESCRIPTION

Figure 1:
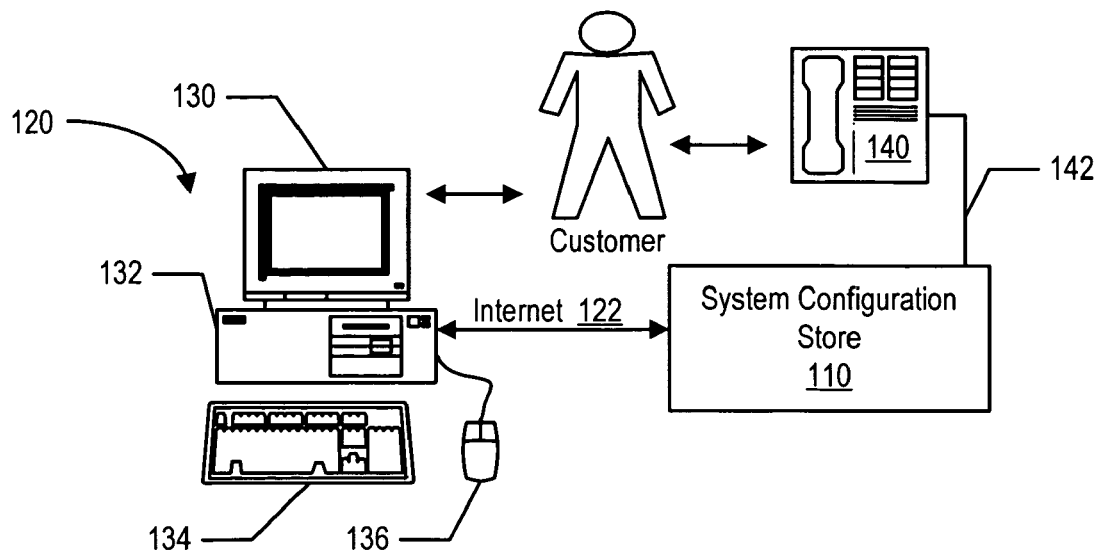
FIG. 1 shows a block diagram of a customer accessing a system configuration store.

Referring to FIG. 1, a customer can access a system configuration store 110 using any suitable computer equipment 120, via the Internet 122. The computer equipment 120 may include a display 130, computer 132, keyboard 134, and pointing device 136. Display 130 is used for displaying the various pages of the on-line store while a customer is using the on-line store. Alternately, a customer can access the system configuration store 110 via a telephone 140 which is coupled to the system configuration store via a telephone network 142. In the case of a telephone access to the system configuration store, the customer speaks with a sales representative who obtains the configuration information from the customer and in turn enters the information into the system configuration store 110 to configure a system. The system configuration store 110 also enables a customer to purchase peripherals either with a system or independent of a system.

Figure 2:
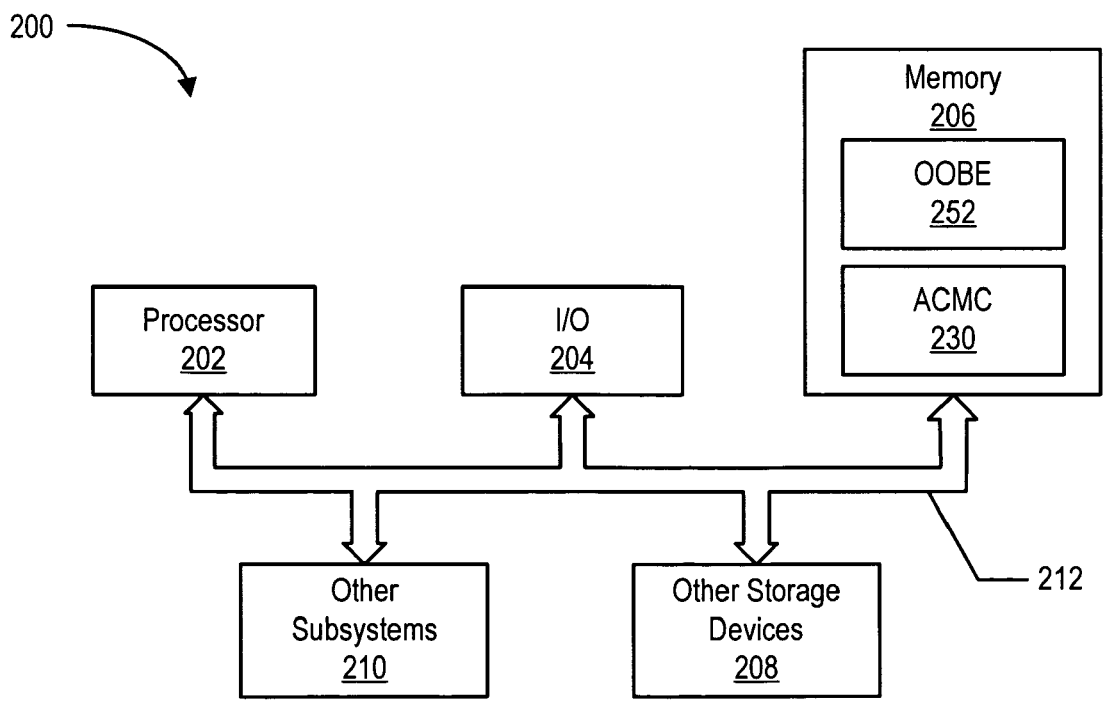
FIG. 2 shows a system block diagram of an information handling system.

Referring to FIG. 2, a system block diagram of an information handling system 200 is shown having features configured in accordance with the system configuration store 110. The information handling system 200 includes a processor 202, input/output (I/O) devices 204, such as a display, a keyboard, a mouse, and associated controllers, memory 206 including volatile memory such as random access memory (RAM) and non-volatile memory such as a hard disk and drive, and other storage devices 208, such as a floppy disk drive, a CD ROM drive and other memory devices, and various other subsystems 210, all interconnected via one or more buses 212.

The information handling system may include an after point of sale configuration manager client (ACMC) module 230 as well as an out of box experience (oobe) module 232 stored within the memory 206.

For purposes of this invention, an information handling system may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, or other purposes. For example, an information handling system may be a personal computer, a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communicating with external devices as well as various input and output (I/O) devices, such as a keyboard, a mouse, and a video display. The information handling system may also include one or more buses operable to transmit communications between the various hardware components.

Figure 3:
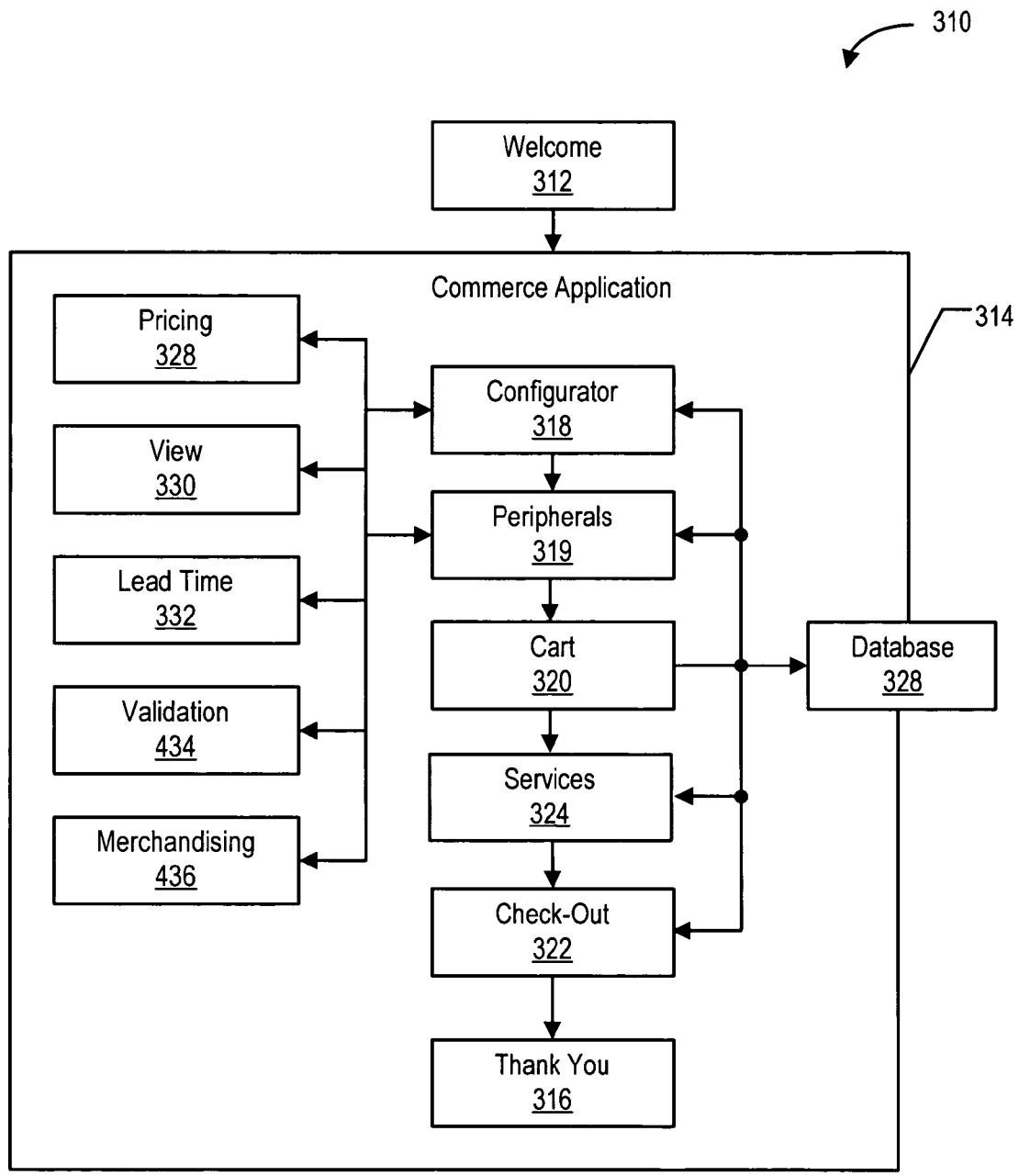
FIG. 3 shows a schematic block diagram of the system configuration store.

Referring to FIG. 3, an on-line store is a component of an Internet website to which a customer may go to configure a particular information handling system, for example, according to desired options of the customer. An on-line store is one example of a system configuration store 110. The on-line store is typically a subset of a larger Internet website. At the on-line store, a customer can select one or more products in which the customer is interested. Upon selection of a particular product, the on-line store presents the customer with the ability to go to the product information for the particular product, customize the product, price the customized product, purchase the product, and other actions as discussed herein. While shopping happens in the website (i.e., selection of a particular kind of system by a customer), when the customer is ready to purchase a customized system, the customer is then directed to that part of the website which the on-line store application controls.

An on-line store 310 for use in generating customer configured information handling systems, e.g., customer configured computer systems, is shown. The on-line store 310 includes a welcome or introductory module 312, a commerce application module 314, and a thank you module 316. The on-line store 310 includes an on-line store user interface which enables the system configuration, pricing, and ordering of an information handling system via the Internet. The commerce application 314 includes a configurator 318, a peripheral module 319, a shopping cart 320, a checkout module 322, a services activation module 324 and database 328. The database 328 provides information to the configurator 318, peripherals module 319, shopping cart 320, checkout module 322, services activation module 324. The configurator 318 (and the peripherals module 319) includes a pricing module 328, a view module 330, a lead time warning module 332, a validation (or compatibility) warning module 334, and a merchandising module 336. The various modules of the configurator 318 are driven by data from the database 328, and thus the configurator 318, shopping cart 320, checkout module 322 and services activation module 324 are all linked to the database 328.

In operation of the on-line store 310, the welcome module 312 presents a welcome page 312, the configurator 318 presents a configurator page, the peripherals module 319 presents a peripherals page, the shopping cart 320 presents a shopping cart page, the checkout module 322 presents a checkout page, the services activation module 324 presents a services activation page and the thank you module 316 presents a thank you page. The welcome page includes a static page and generally resides outside of the commerce application 314. The configurator page, peripherals page, shopping cart page, checkout page, services activation page and registration and customization page are within the commerce application and use information provided by the database. The checkout includes a payment feature, delivery feature, personal versus business feature, and instructional text features (i.e., how to fill out an on-line form.)

The welcome page is typically an introductory page and includes a link into the on-line store 310. The welcome page is typically a static welcome page. Upon completion of configuration of a system, is transferred to a services activation page in which the customer is provided an opportunity to activate various services such as internet service or content services such as music services. After completion of the services activation, the customer is transferred to the registration and customization page. After completion of the registration and customization, the customer is transferred to a checkout page. After completion of the checkout, the customer is transferred to a static thank you page. The thank you page provides a message of gratitude to the customer for having placed the order or for visiting the on-line store.

Aspects of the configurator 318 which interact with database 328 are shown in FIG. 3. In essence, the entire commerce application 314 interacts with the database. The configurator 318, peripherals module 319, shopping cart 320, checkout module 322 and services activation module 324 are each part of the commerce application 314 and interact with the database 328. For example, with the shopping cart 320, additional merchandising information associated with a particular system which has been configured and placed in the shopping cart by an on-line store customer can be provided.

Also for example, various services may be provided for order by the customer by the services module 324 based upon the type of system or peripherals ordered as well as components that are included within the system ordered. Additionally, by providing the services module within the commerce application 314, the customer continues the experience a similar customer experience and the system provider is able to use the information from the database 328 and to maintain control over the customer contact. By maintaining control over the customer contact the system provider is able to determine what services are activated and to maintain accurate and up to date records of the service activation.

When a purchase is processed via the telephone, then the customer representative interacts with a system similar to configurator 318.

Figure 4:
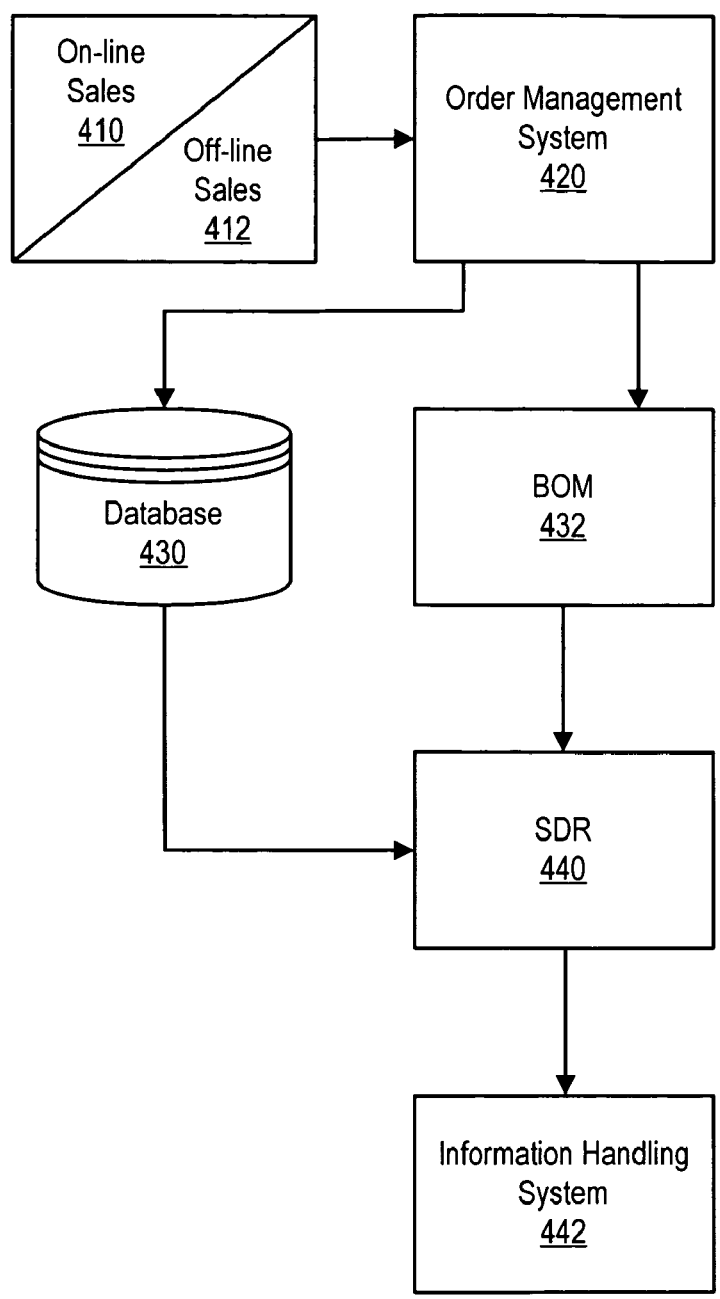
FIG. 4 shows a flow diagram of the configuration of an information handling system to include the customization features.

Referring to FIG. 4, when registration or customization information is obtained either via on-line sales 410 or via off-line (e.g., telephone) sales 412, the information is provided to an order management system 420 which interacts with the factory in which the system is manufactured. The order management system 420 stores this information to a database 430 as well as to a Bill of Materials (BOM) 432 which is associated with a particular system being manufactured or peripheral being purchased. It will be appreciated that one or both the database 430 or the BOM 432 may be used to transfer the information from the customer order to a particular information handling system. The information is then stored in a system descriptor record (SDR) which is stored on the memory of the information handling system 642 being manufactured. Accordingly, the registration or customization information that is obtained from the customer is stored on the system that is manufactured for that customer.

Figure 5:
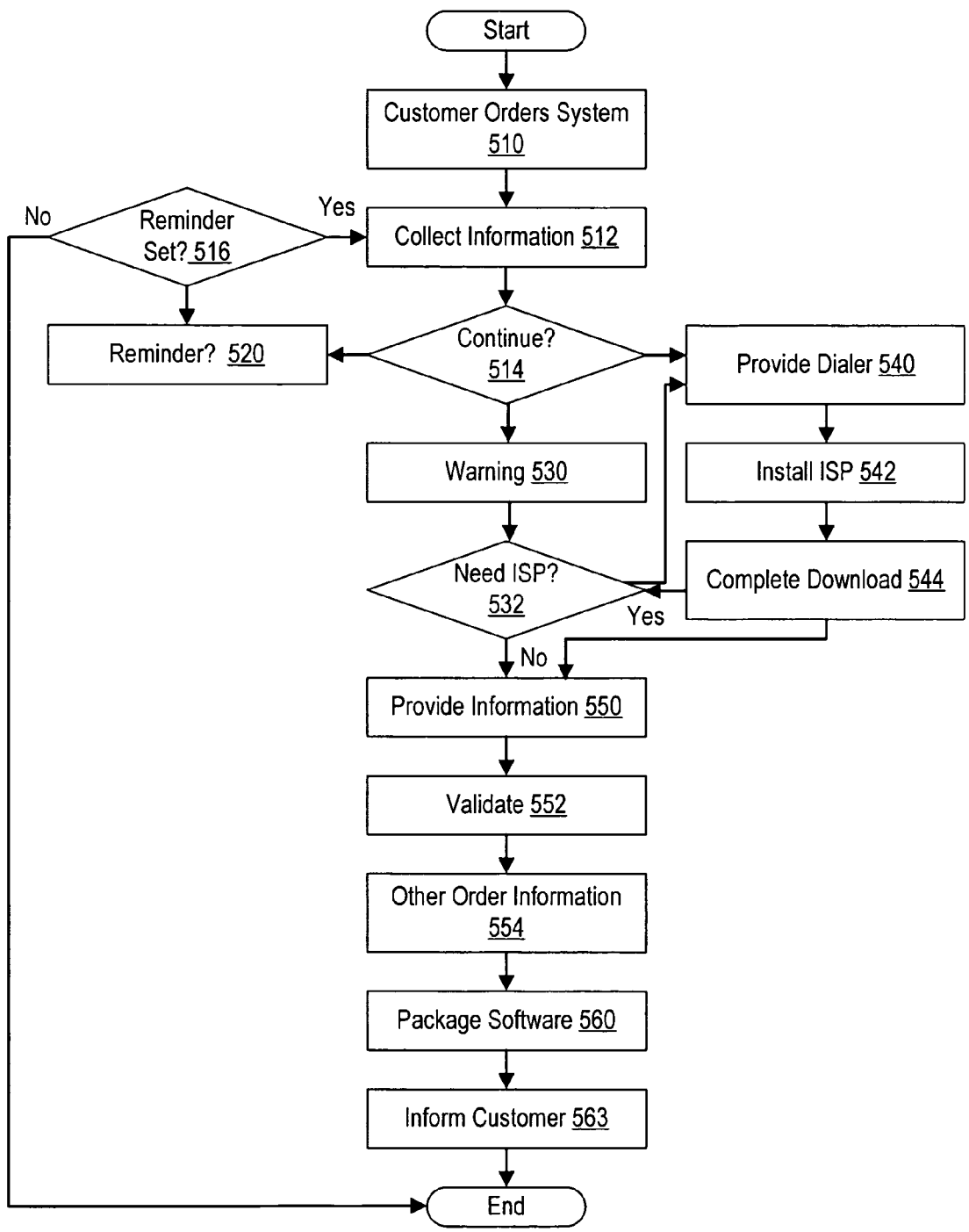
FIG. 5 shows a flow chart of the operation of a post factory dynamic application selection system.

Referring to FIG. 5, a flow chart of the operation of a post factory dynamic application selection system 500 is shown. More specifically, when a customer orders a system (e.g., system 200) at step 510, the system 200 is fabricated to include an after point of sale configuration manager client (ACMC) module 230. When the system 200 is first activated by the customer a collect information step 512 is performed. During the collect information step 512, the out of box experience module 232 executes and then the ACMC module 230 executes. The ACMC module 230 queries the customer about whether the customer desires to download the latest software. This query may be for example via a dialog box which includes an indication of where to actuate to download the latest software. The system 500 determines the response to the query at step 514.

If the customer indicates a lack of desire to download software, then the customer is queried about whether the customer desires a reminder about downloading software at step 520. If the customer indicates such a desire as determined by step 522, then after a predetermined amount of time control returns to the collect information step 512. The predetermined amount of time may be set by the system or indicated by the customer. A default may be used if the customer does not indicate an amount of time after which the reminder should occur. If the customer indicates a lack of desire for a reminder, then the operation of the post factory dynamic application selection system 500 completes.

If the customer indicates a desire to download software, then the system 500 issues a warning to the customer that the ACMC module 230 will be sending information (e.g., via the internet) to the system manufacturer at warning step 530. The ACMC module 230 then determines whether the customer needs an internet service provider in order to access the internet at step 532.

If the ACMC module 230 determines that the customer needs an ISP, then the ACMC providers a dialer to be used to connect to a predetermined website at step 540. In one embodiment, the website only allows the customer to download information and access an ISP. Next at step 542, the customer downloads and installs an ISP onto the system 200. At step 544, the customer completes the download of the ISP. The download may be completed for example, by actuating an icon of the ACMC module 230. The ACMC module 230 may present a reminder if the customer forgets to complete the download. After the download is complete, then information such as SDR information, OS, connection type, etc., is provided to manufacturer managed servers at step 550.

If the ACMC module 230 determined that the customer already had an ISP, then the system 500 proceeds to the provide information step 550. When the information is provided to the manufacturer managed servers, then the system 500 uses the manufacturer managed servers to query a database to validate the customer system and to determine the appropriate software to download to the customer system at step 552. The appropriate software to download is determined based upon the ISP by which the customer is connecting to the internet as well as the speed of the connection that the customer system is using. Other information may also be used to determine software to download. For example, if the customer ordered certain software that was preinstalled on the system and updates are available for that software, then the manufacturer managed servers might indicate the availability of the other software for download.

Next at step 554, the system 500 accesses other manufacturers' databases to access other customer information. For example, the other customer information might indicate that the customer has joined a music service or a photo type service. The system 500 then determines whether there is any software for download based upon this additional customer information.

Next the system 500 packages the software for download at step 560. The network connection speed is also determined. Next at step 562, the customer is informed of the size of the download, of their connection speed and an estimate for how long it would take to download the software. The customer is then provided with the opportunity to download the software immediately or to trickle down the software via a trickle technology such as a background intelligent transfer service (BITS) transfer trickle technology.

Other Embodiments

The present invention is well adapted to attain the advantages mentioned as well as others inherent therein. While the present invention has been depicted, described, and is defined by reference to particular embodiments of the invention, such references do not imply a limitation on the invention, and no such limitation is to be inferred. The invention is capable of considerable modification, alteration, and equivalents in form and function, as will occur to those ordinarily skilled in the pertinent arts. The depicted and described embodiments are examples only, and are not exhaustive of the scope of the invention.

For example, it will be appreciated that the order in which the customer is presented with the services activation page, the registration and customization page and check out page may vary. E.g., the customer may checkout before accessing the services activation page. Alternately, the services activation module may not be presented at all.

Also for example, the system 500 does not necessarily need to execute the oobe module 232 before or with the ACMC module 230.

Also for example, an ISP for a dial up connection might be preloaded onto the system during the fabrication of the system to avoid any download time if the customer does not already have an ISP.

Also for example, the above-discussed embodiments include software modules that perform certain tasks. The software modules discussed herein may include script, batch, or other executable files. The software modules may be stored on a machine-readable or computer-readable storage medium such as a disk drive. Storage devices used for storing software modules in accordance with an embodiment of the invention may be magnetic floppy disks, hard disks, or optical discs such as CD-ROMs or CD-Rs, for example. A storage device used for storing firmware or hardware modules in accordance with an embodiment of the invention may also include a semiconductor-based memory, which may be permanently, removably or remotely coupled to a microprocessor/memory system. Thus, the modules may be stored within a computer system memory to configure the computer system to perform the functions of the module. Other new and various types of computer-readable storage media may be used to store the modules discussed herein. Additionally, those skilled in the art will recognize that the separation of functionality into modules is for illustrative purposes. Alternative embodiments may merge the functionality of multiple modules into a single module or may impose an alternate decomposition of functionality of modules. For example, a software module for calling sub-modules may be decomposed so that each sub-module performs its function and passes control directly to another sub-module.

Consequently, the invention is intended to be limited only by the spirit and scope of the appended claims, giving full cognizance to equivalents in all respects.

What is claimed is:

1. A system for post factory dynamic application selection comprising:
    an after point of sale configuration manager client module stored on a customer information handling system by a manufacturer of the information handling system during manufacture of the information handling system, the after point of sale configuration management client module enabling the customer information handling system to access a manufacturer server;
    a software determination module, the software determination module determining which software to provide to the customer information handling system based upon customer information; and,
    a download module, the download module downloading software to the customer information handling system based upon the determining.

2. The system of claim 1 wherein:
    the customer information includes information regarding a customer internet service provider and a connection speed.

3. The system of claim 1 wherein:
    the software determination module obtains information obtained when the customer ordered the customer information handling system.

4. The system of claim 1 wherein:
    the download module provides the customer with an option of immediately downloading the software or for trickle downloading the software.

5. The system of claim 1 wherein:
    the after point of sale configuration manager module includes a baseline connection function, the baseline connection function enabling the customer to automatically connect to the manufacturer server when no internet service provider is present.

6. The system of claim 5 wherein:
    the baseline connection function connects to the manufacturer server via a dialup connection.

7. A method for post factory dynamic application selection comprising:
    enabling the customer information handling system to access a manufacturer server via an after point of sale configuration manager client module stored on a customer information handling system by a manufacturer of the information handling system during manufacture of the information handling system;
    determining which software to provide to the customer information handling system based upon customer information; and,
    downloading software to the customer information handling system based upon the determining.

8. The method of claim 7 wherein:
    the customer information includes information regarding a customer internet service provider and a connection speed.

9. The method of claim 7 wherein:
    the determining includes obtaining information obtained when the customer ordered the customer information handling system.

10. The method of claim 7 wherein:
    the downloading includes providing the customer with an option of immediately downloading the software or for trickle downloading the software.

11. The method of claim 7 wherein:
    the after point of sale configuration manager module includes a baseline connection function, the baseline connection function enabling the customer to automatically connect to the manufacturer server when no internet service provider is present.

12. The method of claim 11 wherein:
    the baseline connection function connects to the manufacturer server via a dialup connection.

13. An apparatus for post factory dynamic application selection comprising:
    means for enabling the customer information handling system to access a manufacturer server, the means for enabling including an after point of sale configuration manager client module stored on a customer information handling system by a manufacturer of the information handling system during manufacture of the information handling system;

means for determining which software to provide to the customer information handling system based upon customer information; and, means for downloading software to the customer information handling system based upon the determining.

14. The apparatus of claim 13 wherein:
the customer information includes information regarding a customer internet service provider and a connection speed.

15. The apparatus of claim 13 wherein:
the means for determining includes means for obtaining information obtained when the customer ordered the customer information handling system.

16. The apparatus of claim 13 wherein:
the means for downloading includes means for providing the customer with an option of immediately downloading the software or for trickle downloading the software.

17. The apparatus of claim 13 wherein:
the after point of sale configuration manager module includes a baseline connection function, the baseline connection function enabling the customer to automatically connect to the manufacturer server when no internet service provider is present.

18. The apparatus of claim 17 wherein:
the baseline connection function connects to the manufacturer server via a dialup connection.

* * * * *